United States Patent
Suzuki

(10) Patent No.: US 8,941,867 B2
(45) Date of Patent: Jan. 27, 2015

(54) PRINTING SYSTEM, SERVER APPARATUS, INFORMATION PROCESSING METHOD, AND STORAGE MEDIUM

(75) Inventor: Shinya Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 13/565,668

(22) Filed: Aug. 2, 2012

(65) Prior Publication Data
US 2013/0033727 A1 Feb. 7, 2013

(30) Foreign Application Priority Data
Aug. 5, 2011 (JP) .................................. 2011-172180

(51) Int. Cl.
G06F 3/12 (2006.01)
G06K 15/00 (2006.01)

(52) U.S. Cl.
CPC ............ G06F 3/1205 (2013.01); G06F 3/1208 (2013.01); G06F 3/1255 (2013.01); G06F 3/1267 (2013.01); G06F 3/1288 (2013.01)
USPC ........ 358/1.15; 358/1.13; 358/1.18; 358/1.16

(58) Field of Classification Search
CPC ... G06F 3/1267; G06F 3/1255; G06F 3/1254; G06F 3/1258
See application file for complete search history.

(56) References Cited

U.S. PATENT DOCUMENTS

| 2009/0190150 A1* | 7/2009 | Selvaraj et al. ............... | 358/1.13 |
| 2011/0157631 A1* | 6/2011 | Tsutsumi ...................... | 358/1.15 |
| 2011/0181910 A1* | 7/2011 | Suzuki ......................... | 358/1.15 |
| 2012/0120439 A1* | 5/2012 | Minagawa ................... | 358/1.15 |

FOREIGN PATENT DOCUMENTS

JP 4033857 B2 1/2008

* cited by examiner

Primary Examiner — Dov Popovici
(74) Attorney, Agent, or Firm — Canon USA Inc. IP Division

(57) ABSTRACT

A printing system, responsive to a request from an image forming apparatus, applies general-purpose print setting to print setting information of a printer driver in the image forming apparatus specified in the request, applies dedicated print setting using a ticket in a print job stored in a storage device to the print setting information to which the general-purpose print setting has been applied, reflects the print setting information of the printer driver to which the dedicated print setting has been applied, on the print setting information in the print job, generates a print job including the reflected print setting information in the print job and print data in the print job, and outputs the generated print job to the image forming apparatus.

15 Claims, 15 Drawing Sheets

FIG.10

ANYWHERE PRINTING

Taro Yamada | UPDATE | NUMBER OF DOCUMENTS: 7

| DOCUMENT NAME | COLOR MODE | TWO-SIDED | PAGE AGGREGATION | NUMBER OF COPIES | DATE/TIME |
|---|---|---|---|---|---|
| ■ STATEMENT OF ACCOUNT | COLOR | ONE-SIDED | 1in1 | 1 | 01/14 10:19 |
| ☐ ESTIMATE | MONOCHROME | ONE-SIDED | 1in1 | 5 | 01/14 10:19 |
| ☐ LEAVE APPLICATION FORM | MONOCHROME | TWO-SIDED | 1in1 | 1 | 01/14 10:19 |
| ☐ PROJECT PROPOSAL | COLOR | ONE-SIDED | 1in1 | 1 | 01/14 10:20 |
| ☐ 11111111112222222222333333334444444444 | MONOCHROME | ONE-SIDED | 1in1 | 1 | 01/14 10:20 |
| ☐ ABCDEFGHIJKLMNOPQRST | MONOCHROME | ONE-SIDED | 1in1 | 1 | 01/14 10:21 |
| ☐ CONFERENCE MATERIAL | COLOR | ONE-SIDED | 2in1 | 1 | 01/14 10:21 |

1/1 ◄ ►     ◄◄ ►►

| SELECT ALL | CANCEL SELECTION | DELETE | | CHANGE SETTING | PRINT |

LOGOUT

PRINTING SYSTEM, SERVER APPARATUS, INFORMATION PROCESSING METHOD, AND STORAGE MEDIUM

BACKGROUND OF THE INVENTION

1. Field of the Invention

The present invention relates to a printing system, a server apparatus, an information processing method, and a storage medium.

2. Description of the Related Art

In a so-called "pull-print" printing system, a user requests printing of page description language (PDL) data temporarily stored on a server from a printing apparatus to enable an output from the printing apparatus (see Japanese Patent No. 4,033,857). When printing is performed from an application, a user does not output print data from a specific printing apparatus, but can output from any desired printing apparatus. However, the PDL data temporarily stored has already been dependent on the printing apparatus, and is not presumed to be printed on another model because print setting cannot be changed.

In a conventional pull-print printing system, if a print setting structure of a printer driver provided in a client personal computer (PC) differs from a print setting structure of a printer driver provided in a server, the following issue occurs. Print setting of the printer driver provided in the client PC is initialized in the server so that printing, on which the print setting performed in the client PC is reflected, cannot be performed.

SUMMARY OF THE INVENTION

An aspect of the present invention is directed to enabling printing, on which print setting performed in a client PC is reflected, in a pull-print printing system.

According to an aspect of the present invention, a printing system includes a client apparatus, a server apparatus, and an image forming apparatus, where the client apparatus includes a ticket generation unit configured to generate a readable ticket from print setting information set by a printer driver in the client apparatus, a print job generation unit configured to generate an intermediate-format print job, which is not dependent on the specific image forming apparatus, including the print setting information, the ticket generated by the ticket generation unit, and rendering data, and a sending unit configured to send the print job generated by the print job generation unit to the server apparatus, and where the server apparatus includes a receiving unit configured to receive the print job sent by the sending unit, a storage unit configured to store the print job received by the receiving unit in a storage device, a reflection unit configured to, responsive to a print request from the image forming apparatus, to apply general-purpose print setting to the print setting information of a printer driver in the image forming apparatus specified in the print request, apply dedicated print setting to the print setting information to which the general-purpose print setting has been applied using the ticket in the print job stored in the storage device, and reflect print setting information obtained from the ticket on the printer driver in the image forming apparatus to which the print setting information in the print job cannot be applied, and an output unit configured to generate the print job based on the print setting information reflected by the reflection unit and the rendering data, and output the generated print job to the image forming apparatus.

Further features and aspects of the present invention will become apparent from the following detailed description of exemplary embodiments with reference to the attached renderings.

BRIEF DESCRIPTION OF THE DRAWINGS

The accompanying renderings, which are incorporated in and constitute a part of the specification, illustrate exemplary embodiments, features, and aspects of the invention and, together with the description, serve to explain the principles of the invention.

FIG. 10 illustrates an example of a print job list display screen.

DESCRIPTION OF THE EMBODIMENTS

Various exemplary embodiments, features, and aspects of the invention will be described in detail below with reference to the renderings.

Figure 1:
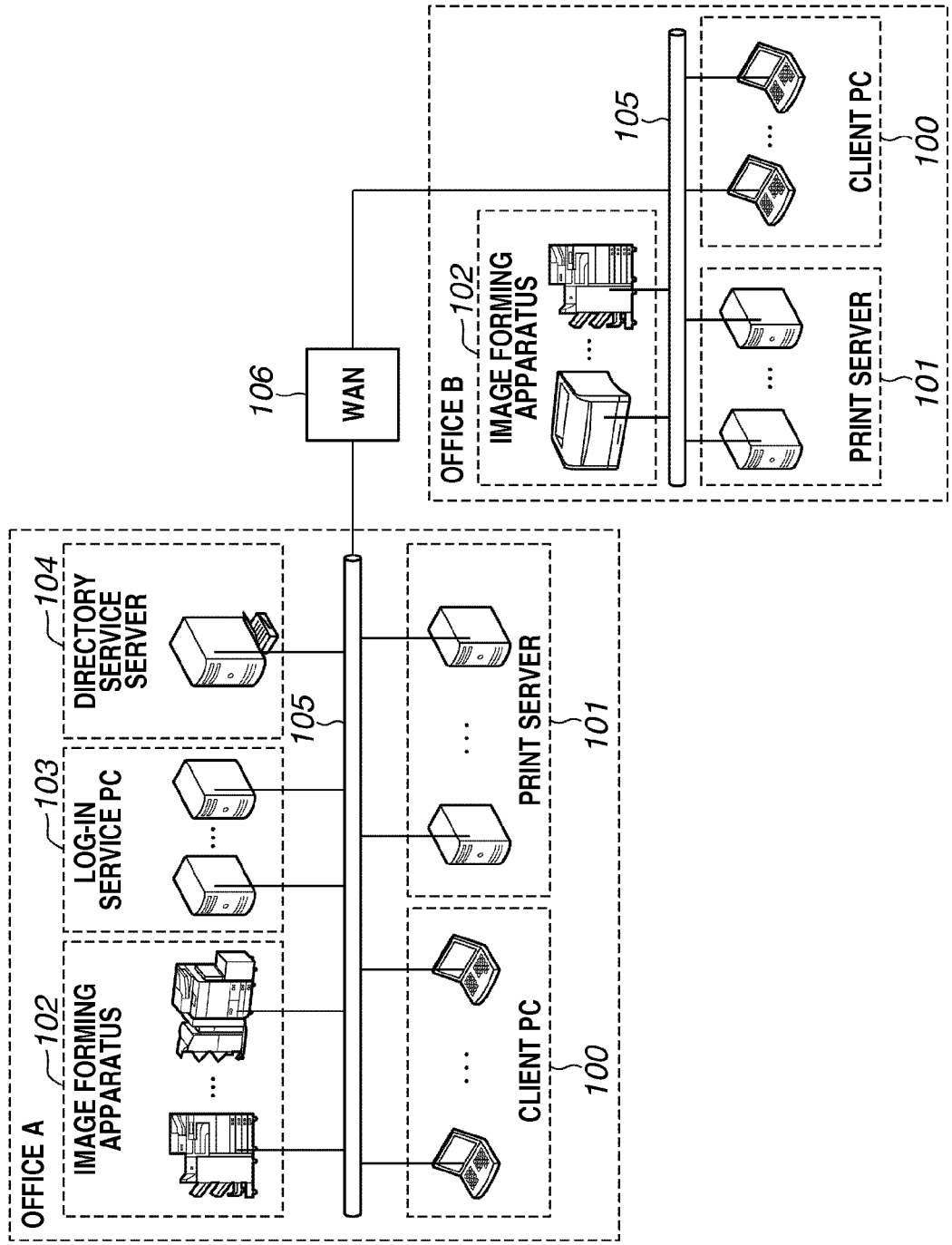
FIG. 1 illustrates an example of a system configuration of a printing system.

FIG. 1 illustrates an example of a system configuration of a printing system according to the present exemplary embodiment. As illustrated in "office A" in FIG. 1, one or a plurality of client PCs 100, print servers 101, image forming apparatuses 102 of a different model, log-in service PCs 103, and a directory service server 104 are connected to communicate with the printing system via a local area network (LAN) 105.

Only a virtual printer driver is installed on the client PC 100. The virtual printer driver generates an intermediate-format print job independent of the specific image forming apparatus 102 from data received from a client application, embeds a readable ticket generated from print setting information, and sends the embedded readable ticket to the print server 101. The intermediate-format print job is print data having a format, the specification of which is open to the public and which is easily re-edited. The format includes an enhance metafile spool (EMFSPOOL) format and a portable document format (PDF). While the EMFSPOOL format is used in the present exemplary embodiment, print data having another intermediate format such as an extensible markup language page specification (XPS) or a PDF may also be used.

The print server 101 stores the received EMFSPOOL-format print job and meta data generated based on the EMFSPOOL-format print job in a predetermined storage location. The print sever 101 includes a job management database (hereinafter referred to as a job management DB). The job management DB stores and manages the meta data and the EMFSPOOL-format print job. The meta data is data describing print setting information for displaying a print job list, which is generated from a DEVMODE structure (hereinafter referred to as a DEVMODE) and a readable ticket embedded in the EMFSPOOL-format print job.

The DEVMODE is print setting information used in Windows (registered trademark). The DEVMODE is formulated by Microsoft (registered trademark) Corporation to store various types of setting including default operating conditions relating to a logical printer such as a function usable by a printer, layout setting, finishing setting, sheet feeding/discharge setting, and print quality setting. The print server 101 generates print job list data from the meta data and the EMFSPOOL-format print job, and performs control to transfer it to the image forming apparatus 102.

Further, the print server 101 determines whether a DEVMODE of the EMFSPOOL-format print job stored in the predetermined storage location is compatible with a printer driver corresponding to the print target image forming apparatus 102. The print server 101 processes, if it determines that the DEVMODE is compatible with the printer driver corresponding to the print target image forming apparatus 102, the DEVMODE so that the printer driver can recognize the DEVMODE, to perform printing. The print server 101 generates, if it determines that the DEVMODE is incompatible with the printer driver corresponding to the print target image forming apparatus 102, a DEVMODE on which print setting information is reflected, using the readable ticket embedded in the EMFSPOOL-format print job, to perform printing.

The log-in service PC 103 is used as a log-in service for the image forming apparatus 102. The log-in service PC 103 performs authentication processing based on a user name and a password of the client PC 100 (e.g., a log-in user name or a password of Windows) that are stored and managed by the directory service server 104. An example of the log-in service PC 103 is a personal computer equipped with Canon Security Agent.

The directory service server 104 stores and manages information such as information about a server, a client, and a printer existing on a network and an attribute of a user who uses them in a uniform manner. An example of the directory service server 104 is a server equipped with an active directory function.

In the printing system according to the present exemplary embodiment, "office A" having the above-mentioned configuration and "office B" having a configuration in which one or a plurality of client PCs 100, print servers 101, and image forming apparatuses 102 are connected to communicate with one another via the LAN 105, may be connected to each other via a wide area network (WAN) 106.

Figure 2:
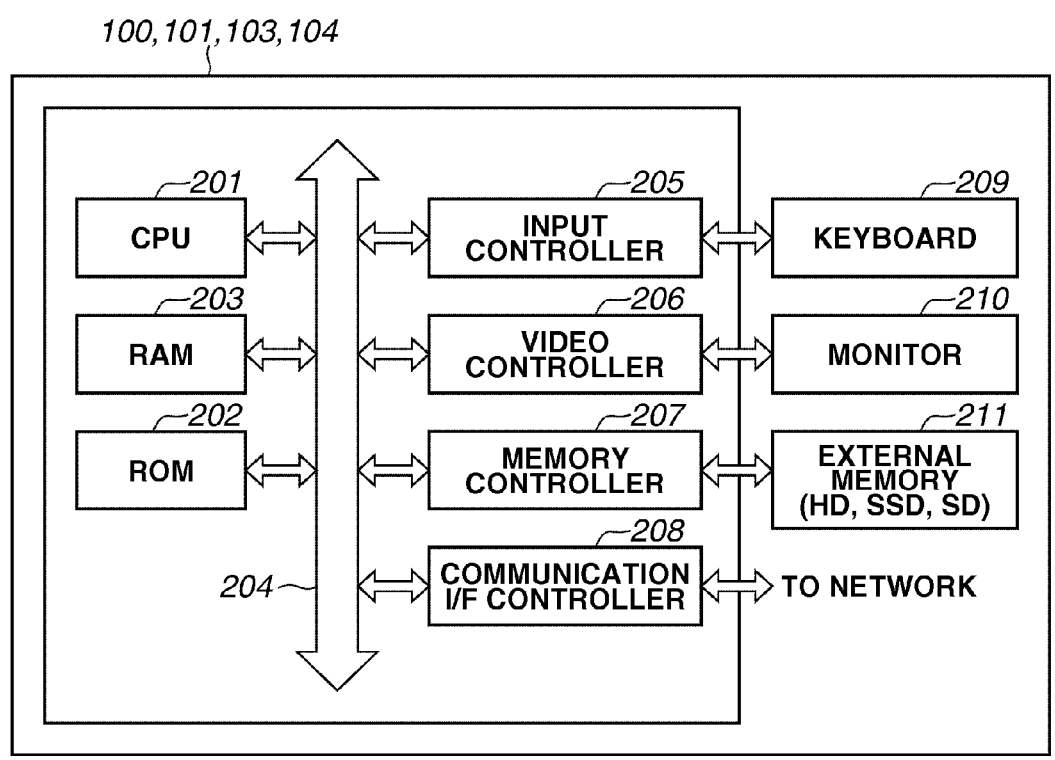
FIG. 2 illustrates an example of a hardware configuration of an information processing apparatus that is applicable to a client PC, a print server, a log-in service PC, and a directory service server.

A hardware configuration of an information processing apparatus, which is applicable to the client PC 100, the print server 101, the log-in service PC 103, and the directory service server 104 illustrated in FIG. 1, will be described with reference to FIG. 2. FIG. 2 illustrates an example of the hardware configuration of the information processing apparatus that is applicable to the client PC 100, the print server 101, the log-in service PC 103, and the directory service server 104 illustrated in FIG. 1.

In FIG. 2, a central processing unit (CPU) 201 comprehensively controls image forming apparatuses 102 and controllers that are connected to a system bus 204.

A read-only memory (ROM) 202 and an external memory 211 store a basic input/output system (BIOS) program and an operating system (OS) program, which serve as a control program of the CPU 201, and various programs, described below, required to implement a function executed by each of the servers or the PCs. The RAM 203 functions as a main memory or a work area of the CPU 201.

The CPU 201 implements various operations by loading a program required in executing processing into the RAM 203 from the ROM 202 or the external memory 211 and executing the loaded program.

An input controller 205 controls input from a keyboard 209 or a pointing device such as a mouse (not illustrated).

A video controller 206 controls display on a monitor 210. Generally, the monitor 210 is a display device such as a liquid crystal display or a cathode ray tube (CRT). An administrator uses the devices, as needed.

A memory controller 207 controls access to a hard disk (HD) and the external memory 211 such as a secure digital (SD) memory card that store a boot program, various applications, font data, a user file, an edit file, and various types of data.

A communication interface (I/F) controller 208 connects/communicates with an external device via a network (e.g., the LAN 105 illustrated in FIG. 1), and performs communication control processing in the network. For example, the communication I/F controller 208 can perform communication using a transmission control protocol/Internet protocol (TCP/IP). The CPU 201 enables display on the monitor 210 by rasterizing an outline font into a display information area in the RAM 203, for example. The CPU 201 enables a user instruction using, for example, a mouse cursor (not illustrated) on the monitor 210.

Various programs, described below, for implementing the present exemplary embodiment are recorded in the external memory 211. The programs are loaded into the RAM 203, as needed so that the CPU 201 executes the loaded program. Further, a definition file and various information tables used when the program is executed are stored in the external memory 211. Detailed description thereof will be described below.

The CPU 201 performs processing based on the program so that a function of each of the devices is implemented. While the CPU 201 performs processing based on a program corresponding to the printer driver, the printer driver may be described below as performing the processing for sake of simplicity.

Figure 3:
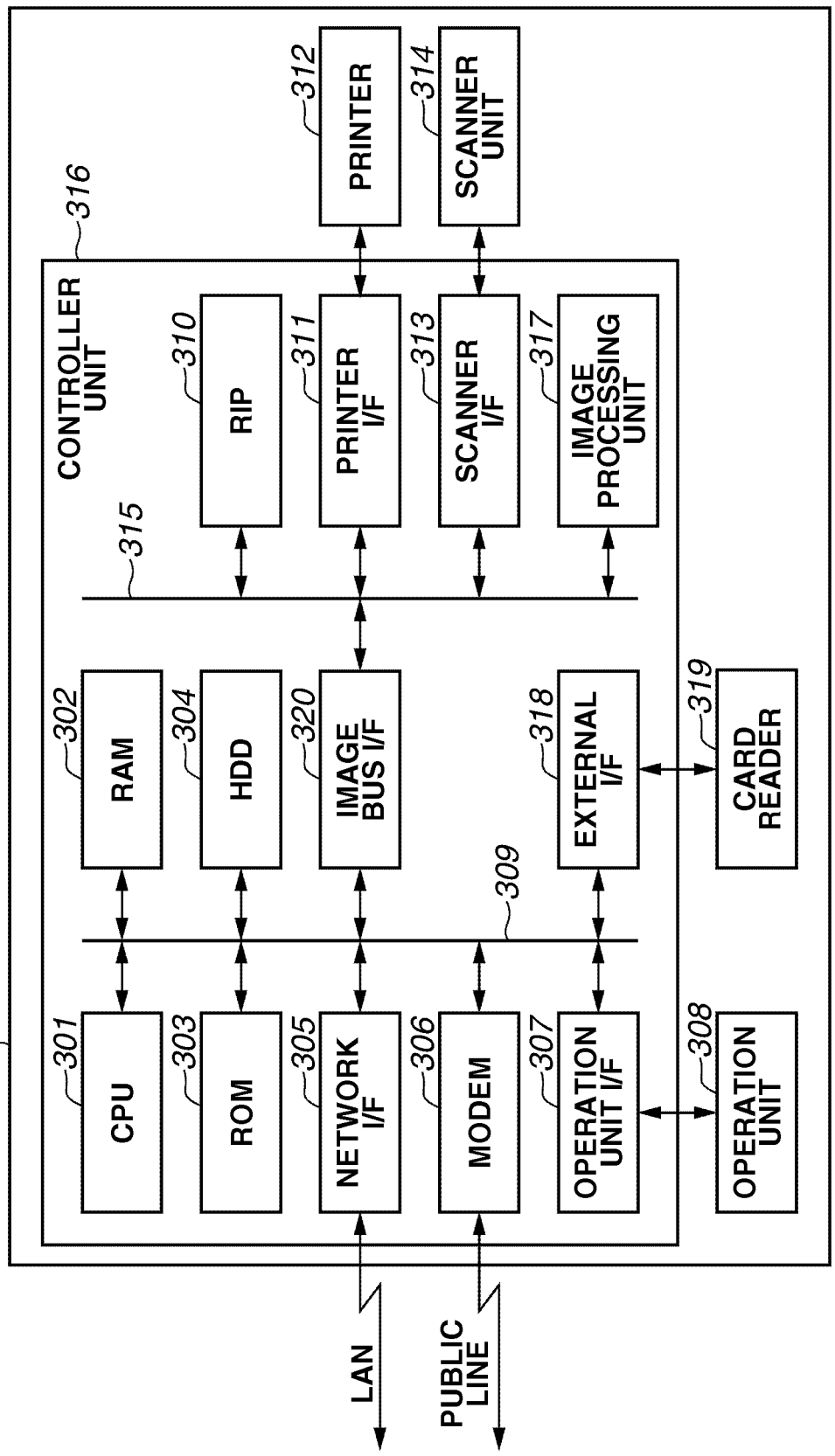
FIG. 3 illustrates an example of a hardware configuration of a controller unit in the image forming apparatus.

A hardware configuration of a controller unit for controlling the image forming apparatus 102 illustrated in FIG. 1 will be described with reference to FIG. 3. FIG. 3 illustrates an example of the hardware configuration of the controller unit in the image forming apparatus 102 illustrated in FIG. 1.

In FIG. 3, a controller unit 316 is connected to a scanner unit 314 functioning as an image input device and a printer unit 312 functioning as an image output device. The controller unit 316 is connected to a LAN (e.g., the LAN 105 illustrated in FIG. 1) and a public line (a wide area network (WAN)) (e.g., a public switched telephone network (PSTN) or an integrated services digital network (ISDN)), to input and output image data and image forming apparatus information.

In the controller unit 316, a CPU 301 is a processor for controlling the entire printing system.

A RAM 302 is a system work memory for the CPU 301 to operate, and is also a program memory for recording a program and an image memory for temporarily recording image data.

A ROM 303 stores a boot program and various control programs for the printing system.

A hard disk drive (HDD) 304 stores various programs and image data for controlling the printing system.

An operation unit interface (I/F) 307 is an interface with an operation unit (a user interface (UI)) 308, and outputs image data to be displayed on the operation unit 308 to the operation unit 308. The operation unit I/F 307 functions to transmit information input by a user of the printing system (e.g., user information), from the operation unit 308 to the CPU 301.

The operation unit 308 includes a display unit having a touch panel, and can issue various instructions when the user presses (touches with his/her finger) a button displayed on the display unit.

A network I/F 305 is connected to the network (the LAN 105), to input and output data.

A modem (MODEM) 306 is connected to the public line, to input and output data, for example, transmit and receive a facsimile (FAX).

An external interface (external I/F) 318 is an I/F unit, which receives external inputs, such as a universal serial bus (USB), Institute of Electrical and Electronic Engineers 1394 (IEEE 1394), or a printer port. In the present exemplary embodiment, a card reader 319 for reading an integrated circuit (IC) card required for authentication is connected to the external I/F 318. The CPU 301 can control reading of information from the IC card by the card reader 319 via the external I/F 318, and acquire the information read from the IC card.

The above-mentioned image forming apparatus 102 is arranged on the system bus 309.

An image bus I/F 320 is a bus bridge that connects the system bus 309 and an image bus 315 for transferring image data at high speed and converts a data structure.

The image bus 315 includes a peripheral components interconnect (PCI) bus or IEEE 1394. The image forming apparatus 102, described below, is arranged on the image bus 315.

A raster image processor (RIP) 310 rasterizes vector data such as a PDL code into a bit map image, for example.

A printer I/F 311 connects the printer unit 312 and the controller unit 316, and performs synchronous/asynchronous conversion of image data.

A scanner interface (scanner I/F) 313 connects the scanner unit 314 and the controller unit 316, and performs synchronous/asynchronous conversion of image data.

An image processing unit 317 corrects, processes, and edits input image data, and corrects a printer and converts resolution for print output image data. In addition, the image processing unit 317 rotates image data, and performs compression/expansion processing such as Joint Photographic Experts Group (JPEG) for multivalued image data, and Joint B-level Image Experts Group (JBIG), Modified Modified READ (MMT), and Modified Huffman (MH) for binary image data.

The scanner unit 314 illuminates a document sheet with an image, and scans the document sheet using a charge coupled device (CCD) scanner, to convert the image into an electric signal as raster image data. Copy sheets are set on a tray of a document feeder. The user of the printing system gives an instruction to start reading from the operation unit 308, so that the CPU 301 gives an instruction to the scanner unit 314, and the document feeder feeds the copy sheets one at a time, to perform a reading operation of a document image.

The printer unit 312 converts the raster image data into an image on the sheet. While a method for the conversion includes an electrophotographic method using a photosensitive drum or a photosensitive belt or an inkjet method for directly printing an image on a sheet by discharging ink from a minute nozzle array, any system may be used. A print operation is started by an instruction from the CPU 301. The printer unit 312 includes a plurality of sheet feed stages so that different sheet sizes or different sheet directions can be selected. There are sheet cassettes respectively corresponding to the sheet feed stages.

The operation unit 308 includes a liquid crystal display (LCD) unit and has a touch panel sheet affixed on its LCD, and displays an operation screen of the printing system while transmitting, when a displayed key is pressed, its positional information to the CPU 301 via the operation unit I/F 307.

The operation unit 308 includes a start key, a stop key, an ID key, and a reset key, for example, as various types of operation keys. The start key in the operation unit 308 is used when a reading operation of a document image is started, for example. There are light emitting diodes (LEDs) in two colors, i.e., green and red at the center of the start key. The color of the LED indicates whether the start key can be used. The stop key in the operation unit 308 functions to stop an operation that is being performed. The ID key in the operation unit 308 is used when the user ID is input. The reset key is used when setting from the operation unit 308 is initialized.

The card reader 319 reads information stored in the IC card under control from the CPU 301, and notifies the CPU 301 of the read information via the external I/F 318.

By the above-mentioned configuration, the image forming apparatus 102 can send image data read from the scanner unit 314 to the LAN 105, and the printer unit 312 can print and output print data received from the LAN 105. The image forming apparatus 102 can facsimile-transmits the image data read from the scanner unit 314 to the public line using the modem 306, and output the image data facsimile-transmitted from the public line using the printer unit 312.

The overall flow for displaying detailed information in the printing system according to the present exemplary embodiment will be described with reference to FIG. 4. A premise of the pull printing according to the present exemplary embodiment will be first described.

To perform the pull-print printing according to the present exemplary embodiment, a virtual printer driver 401 is installed on the client PC 100. The virtual printer driver 401 has a function of generating print data based on an output of a printing and rendering instruction issued from the client application 400. Further, the virtual printer driver 401 has a function of setting print setting information (a user interface) for controlling functions of a printer driver and a printer. The virtual printer driver 401 also has a function of storing its print setting information (DEVMODE) in an external storage device for each installed logical printer.

The overall flow of the pull printing according to the present exemplary embodiment will be described below. FIG. 4 is a schematic view for illustrating the overall flow of the printing system according to the present exemplary embodiment.

Figure 4:
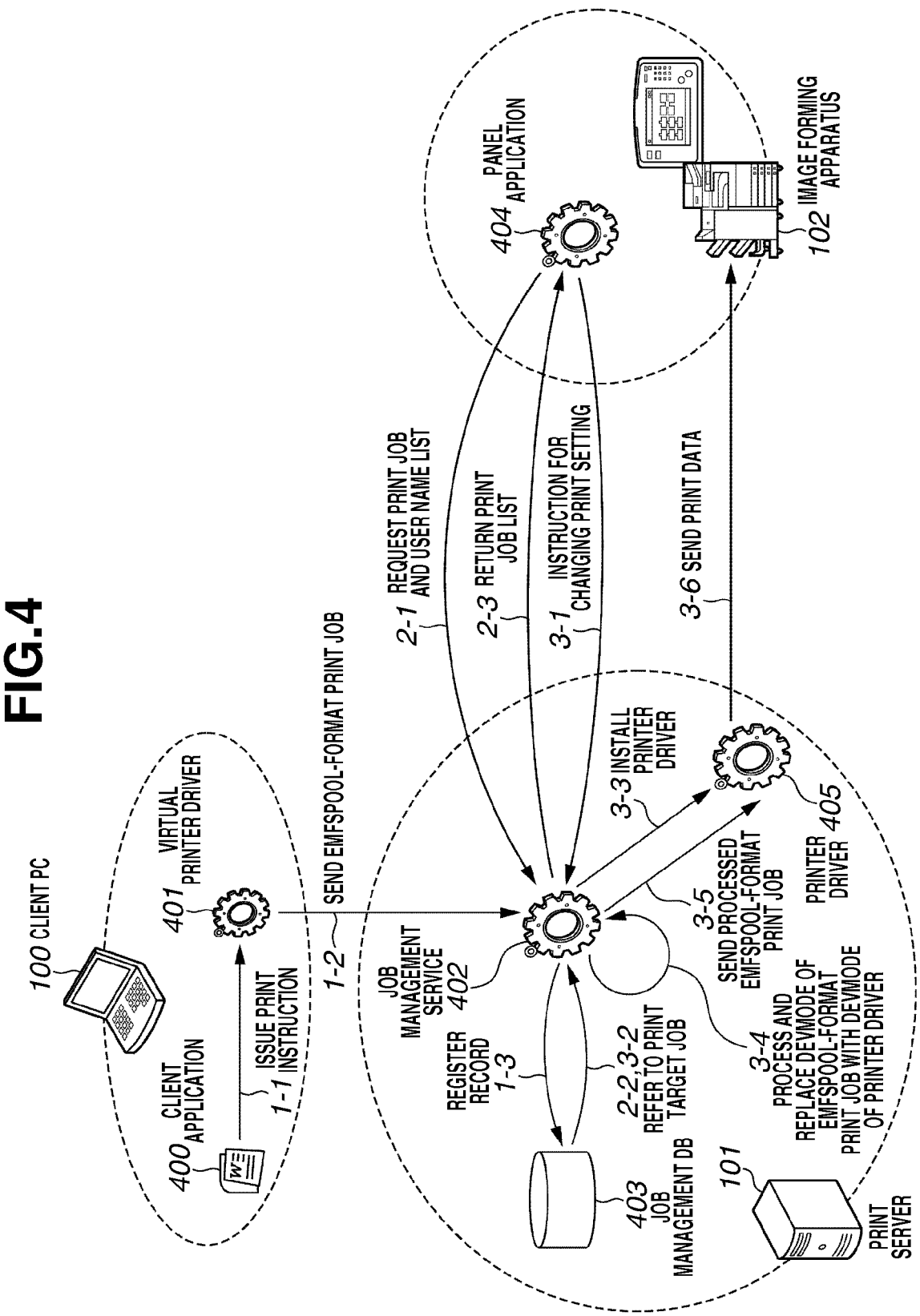
FIG. 4 is a schematic view illustrating the overall flow of the printing system.

As illustrated in FIG. 4, a user first logs into the client PC 100, to issue a print instruction to a logical printer corresponding to the virtual printer driver 401 from the client application 400 executed by the client PC 100 (1-1).

The client application 400 in the client PC 100, responsive to the print instruction, sends data to the virtual printer driver 401 via a graphic engine.

The virtual printer driver 401 in the client PC 100 generates an EMFSPOOL-format print job independent of the image forming apparatus 102 based on the data received via the graphic engine from the client application 400.

Further, the virtual printer driver 401 generates a readable ticket from print setting information set by the user, and embeds the generated ticket in the EMFSPOOL-format print job.

The readable ticket is data storing print setting information (hereinafter referred to as dedicated print setting) stored in an area, which can be freely managed by a driver developer in a DEVMODE, in a format that can be understood by anyone. In contrast, print setting information, which is stored in a fixed area of a DEVMODE and is easily accessible, is referred to as general-purpose print setting.

The dedicated print setting can be freely defined by a driver creator, and a method of the setting may be different not only when a driver is that of another company but also different depending on a model and a version of a driver of the same company. Therefore, the virtual printer driver 401 acquires the dedicated print setting by using a software development kit (SDK) provided by each driver developer. The virtual printer driver 401 can also reflect dedicated print setting on any driver by describing a content of the dedicated print setting in a readable format such as an extensible markup language (XML) format.

Further, while the dedicated print setting acquired using the SDK is used in the present exemplary embodiment, print setting information that has already been described in an XML format, e.g., a print ticket (PT) may be used. In the present exemplary embodiment, dedicated print setting acquired to generate a ticket is limited to main print setting items. Print setting information of a printer driver includes a large number of print setting items. Therefore, if all the print setting items are brought into tickets, the size of the printer driver becomes enormous, which is not suitable for a pull-print printing system in which an EMFSPOOL-format print job is reserved. Readable tickets may be generated from all the print setting items. However, all the print setting items can be taken over by using the processing for replacing the DEVMODE with a compatible DEVMODE, described below. Therefore, the dedicated print setting is limited to the main print setting items.

The client PC 100 sends the generated EMFSPOOL-format print job to the print server 101 (1-2).

A job management service 402 in the print server 101 generates meta data from a DEVMODE of the EMFSPOOL-format print job and the embedded readable ticket. The job management servicer 402 stores the EMFSPOOL-format print job in a predetermined storage location on the print server 101, and registers the meta data and a file name of the EMFSPOOL-format print job in a job management database (DB) 403 (1-3). The job management DB 403 is constructed on an external storage device in the print server 101. At this time, the print server 101 only stores the EMFSPOOL-format print job in the predetermined storage location, and does not send the EMFSPOOL-format print job to the printing system.

The image forming apparatus 102 reads, when it detects an IC card readable by the card reader 319, individual authentication information in the IC card, and sends the read individual authentication information as an authentication request to an authentication server (not illustrated). The individual authentication information is used for authentication and may be a production number of the IC card.

The authentication server performs, when it receives the individual authentication information from the image forming apparatus 102, authentication processing of the individual authentication information based on an IC card authentication table stored on an external storage device in the authentication server, and returns an authentication result to the image forming apparatus 102. The authentication server sends a user identifier of the client PC 100 as an authentication result when authentication has successfully been performed.

A panel application 404 on the image forming apparatus 102 receives an authentication result indicating that authentication (a log-in user identifier of the client PC 100) has successfully been performed. While a user name is used as the user identifier in the present exemplary embodiment, the user identifier may be a production number of the IC card.

The panel application 404 sends the user name at the same time that it requests a print job list from the job management service 402 on the print server 101 (2-1).

The job management service 402 refers to target meta data and an EMFSPOOL-format print job in the job management DB 403 using the user name sent form the panel application 404 (2-2).

The job management service 402 detects all EMFSPOOL-format print jobs corresponding to the sent user name, and returns the print job list to the panel application 404 immediately after the detection is completed (2-3).

The panel application 404 displays, when is receives the print job list from the job management service 402, the print data list on the UI in the operation unit 308.

When the user selects the print job and the print instruction is received, the panel application 404 sends a model name of the image forming apparatus 102, together with the print instruction, to the job management service 402.

The job management service 402 receives the print instruction and the model name (3-1), and refers to the target EMFSPOOL-format print job selected by the user in the job management DB 403 (3-2). The job management service 402 installs a printer driver 405 corresponding to the received model name (3-3).

The job management service 402 then determines whether the printer driver 405 and a DEVMODE associated with the EMFSPOOL-format print job referred to are compatible with each other. The compatible DEVMODE is a DEVMODE that has a structure similar to the printer driver 405 and can be replaced with the printer driver 405 if its easily changeable portion is processed. If it is determined that the DEVMODE is compatible with the printer driver 405, the job management service 402 processes the DEVMODE associated with the EMFSPOOL-format print job into a DEVMODE of the installed printer driver 405 and replace the DEVMODE (3-4). If it is determined that the DEVMODE is incompatible with the printer driver 405, the job management service 402 causes to assume general-purpose print setting, and reflects dedicated print setting that can be acquired from the readable ticket embedded in the EMFSPOOL-format print job on the DEVMODE (3-4).

The job management service 402 sends the EMFSPOOL-format print job including the DEVMODE, on which the above-mentioned processing in (3-4) is reflected, to the printer driver 405 (3-5). The printer driver 405 sends print data (PDL data) based on the EMFSPOOL-format print job including the DEVMODE, on which the processing in (3-4) is reflected, to the image forming apparatus 102 (3-6).

The overall flow of the printing system has been described above. The overall flow will be described in detail below with reference to flowcharts.

Figure 5:
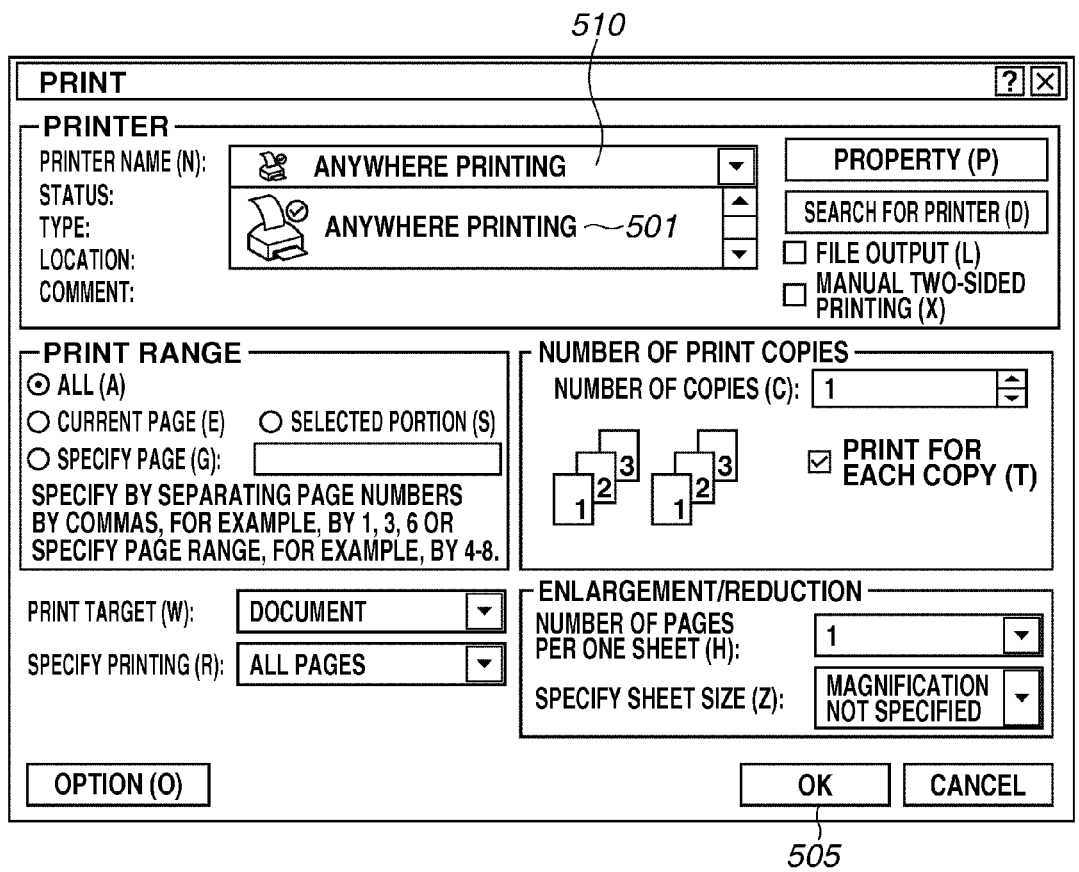
FIG. 5 illustrates an example of a print screen of a client application that operates on the client PC.

A print instruction on the client application 400 that operates on the client PC 100 illustrated in FIG. 1 will be described. FIG. 5 illustrates an example of a print screen of the client application 400 that operates on the client PC 100 illustrated in FIG. 1.

The print screen illustrated in FIG. 5 is displayed under control of the CPU 201 in the client PC 100.

A logical printer selection unit 510 receives, out of logical printers set in the client PC 100, selection of the logical printer that performs printing. In the logical printer selection unit 510, "anywhere printing" 501 is a logical printer corresponding to the virtual printer driver 401 in which the pull printing according to the present exemplary embodiment is set. A user selects an "anywhere printing" logical printer in the logical printer selection unit 510, and presses an OK button 505 using a pointing device or the like. The client application 400 sends data for printing via a graphic engine in the "anywhere printing" logical printer. An operation of the virtual printer driver 401 performed when the logical printer selection unit 510 selects the "anywhere printing" 501 to issue a print instruction, will be described below.

Figure 6:
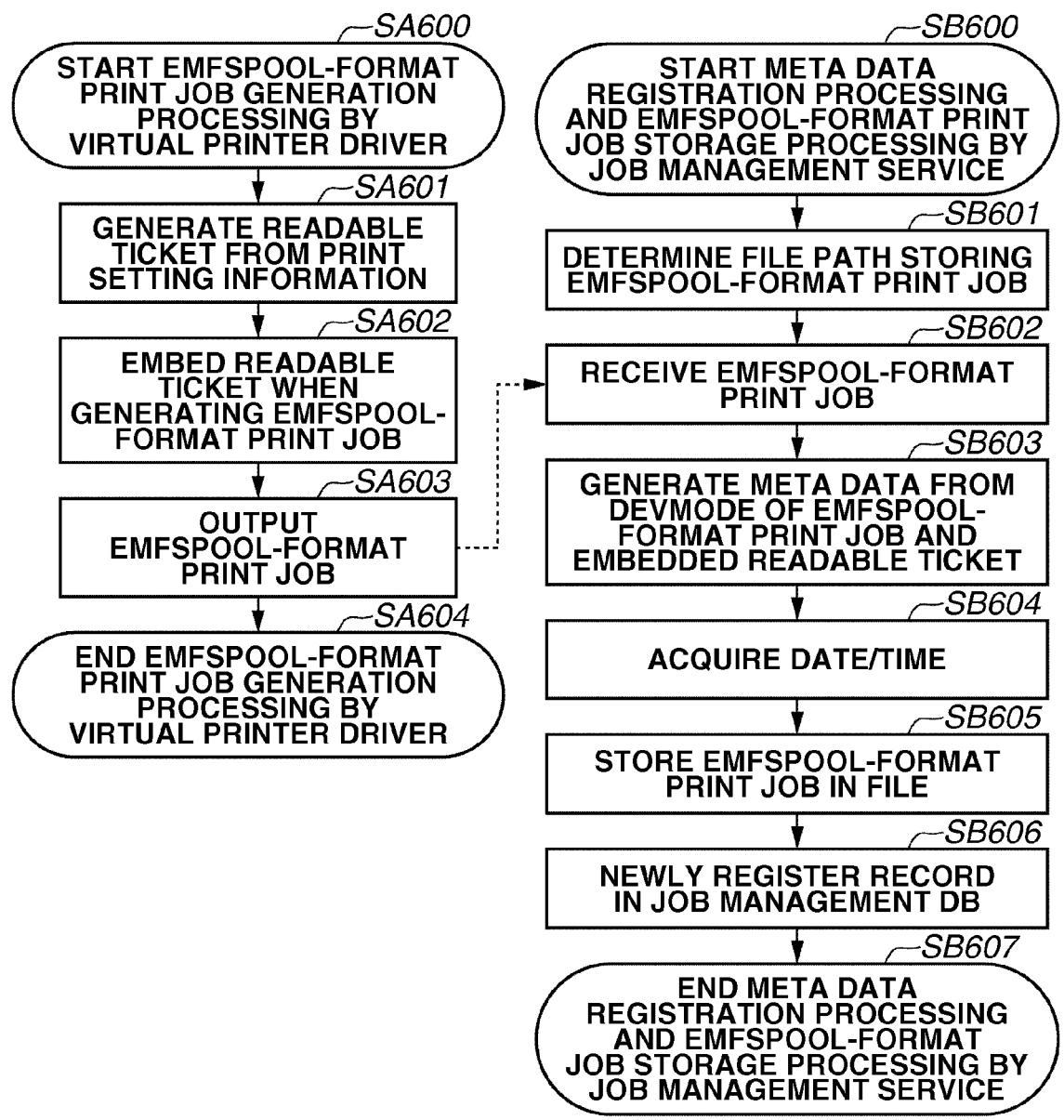
FIG. 6 is a flowchart illustrating an example of a first control procedure in the printing system.

FIG. 6 is a flowchart illustrating an example of a first control procedure in the printing system according to the present exemplary embodiment. The processing illustrated in FIG. 6 corresponds to the processing from (1-1) to the processing (1-3) illustrated in FIG. 4. Steps SA600 to SA604 correspond to processing performed by the virtual printer driver 401 illustrated in FIG. 4.

The processing in the flowchart is implemented when the CPU 201 in the client PC 100 illustrated in FIG. 1 loads a program stored in the external memory 211 onto the RAM 203 and executes the loaded program. Steps SB600 to SB607 correspond to processing performed by the job management service 402 illustrated in FIG. 4. The processing in the flowchart is implemented when the CPU 201 in the print server 101 illustrated in FIG. 1 loads a program stored in the external memory 211 onto the RAM 203 and executes the loaded program.

EMFSPOOL-format print job generation processing performed by the virtual printer driver 401 in the client PC 100 will be first described. In step SA600, the virtual printer driver 401 starts the processing. The processing is started when the virtual printer driver 401 is used to perform printing in the application 400 that is being executed on the client PC 100.

In step SA601, the virtual printer driver 401 generates a readable ticket that can be understood not only by a specific printer driver but commonly by printer drivers, from print setting information in the virtual printer driver 401 (ticket generation). The virtual printer driver 401 acquires dedicated print setting of a DEVMODE via an SDK, and describes the dedicated print setting as a readable ticket. Page aggregation, staple information, and stamp information, for example, are described in the readable ticket. Print setting information such as the number of copies and a print direction is easily accessible and is not included in the ticket because it is general-purpose print setting of the DEVMODE.

In step SA602, the virtual printer driver 401 embeds the readable ticket, which has been generated in step SA601, when generating the EMFSPOOL-format print job.

In step SA603, the virtual printer driver 401 outputs the generated EMFSPOOL-format print job. An IP address of the print server 101 is previously set as an output destination of the virtual printer driver 401.

In step SA604, the virtual printer driver 401 ends the processing.

Meta data registration processing and print job storage processing performed by the job management service 402 in the print sever 101 will be described below.

In step SB600, the job management service 402 starts the processing.

In step SB601, the job management service 402 previously determines a file path storing a received EMFSPOOL-format print job.

In step SB602, the job management service 402 receives an EMFSPOOL-format print job.

In step SB603, the job management service 402 generates meta data from a DEVMODE of the EMFSPOOL-format print job and an embedded readable ticket. The generated meta data is used to present the print setting information to a user in the panel application 404, described below.

In step SB604, the job management service 402 acquires a date/time. The acquired date and time become a print time of the EMFSPOOL-format print job.

In step SB605, the job management service 402 stores the EMFSPOOL-format print job in the file path that has been set in step SB601.

In step SB606, the job management service 402 newly registers a record including the meta data and a file path name in the job management DB 403.

In step SB607, the job management service 402 ends the meta data registration processing and the EMFSPOOL-format print job storage processing.

Figure 7:
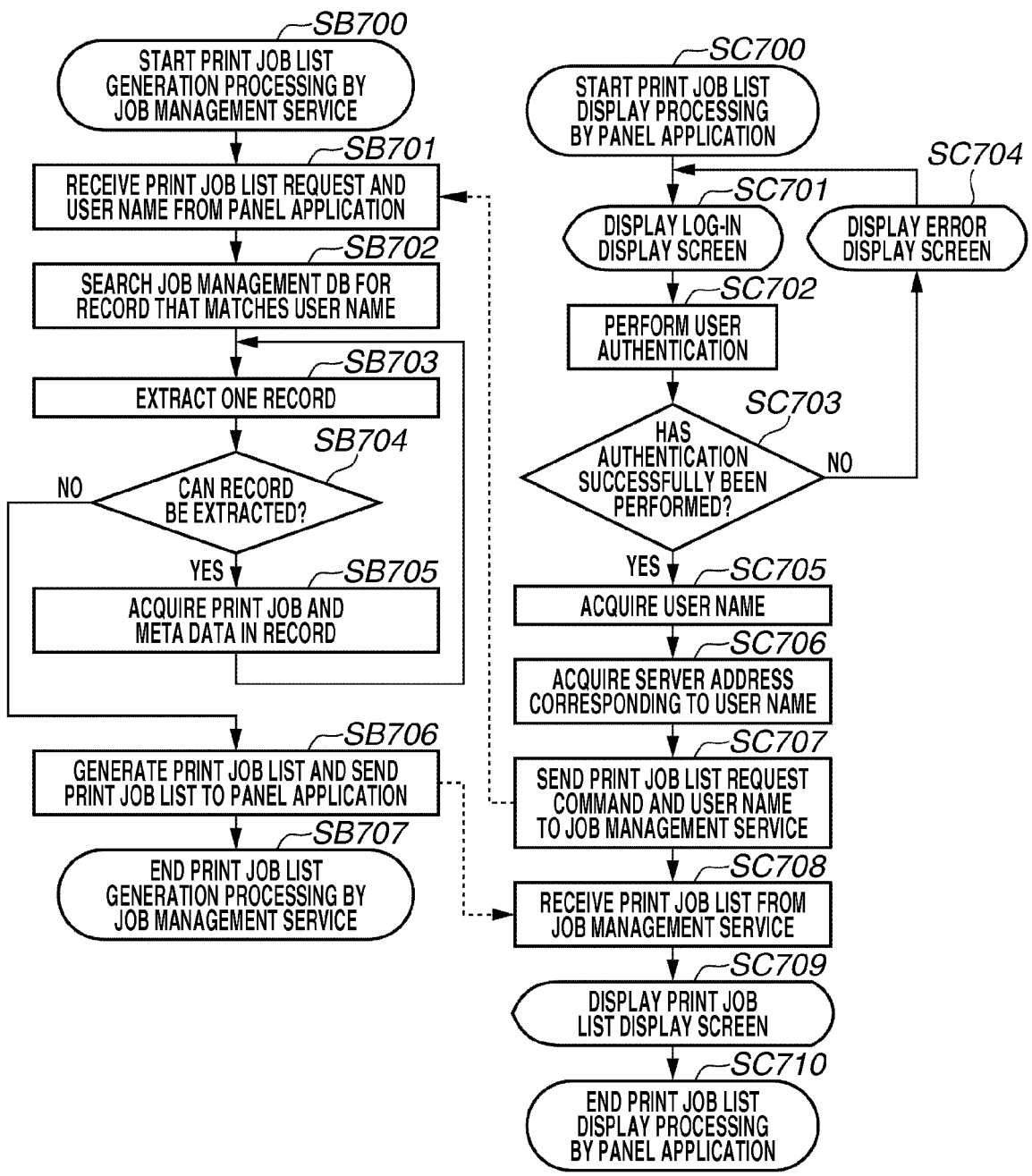
FIG. 7 is a flowchart illustrating an example of a second control procedure in the printing system.

FIG. 7 is a flowchart illustrating an example of a second control procedure in the printing system according to the present exemplary embodiment. The procedure illustrated in FIG. 7 corresponds to a procedure from the processing in (2-1) to the processing in (2-3) illustrated in FIG. 4. Steps SB700 to SB707 correspond to print job list generation processing performed by the job management service 402. The processing in the flowchart is implemented when the CPU 201 in the print server 101 illustrated in FIG. 1 loads a program stored in the external memory 211 onto the RAM 203 and executes the loaded program.

Steps SC700 to SC701 correspond to print job list display processing performed by the panel application 404 illustrated in FIG. 4. The processing in the flowchart is implemented when the CPU 301 in the image forming apparatus 102 illustrated in FIG. 1 loads a program stored in an external memory onto the RAM 302 and executes the loaded program.

The print job list display processing performed by the panel application 404 will be first described.

Figure 8:
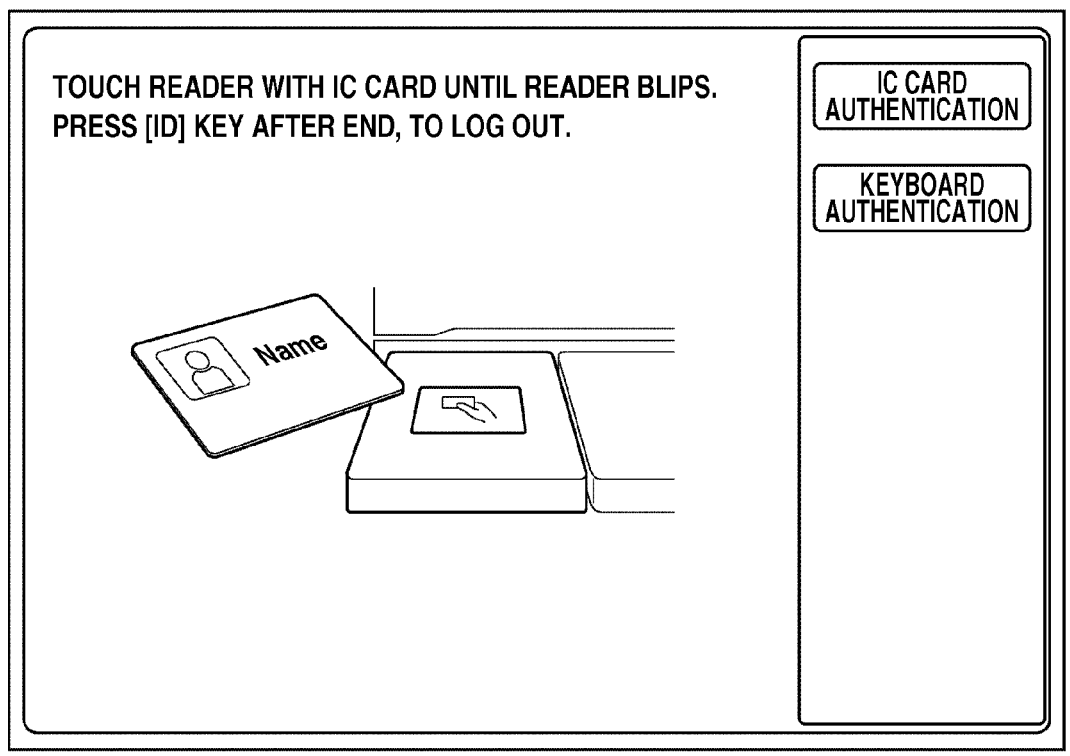
FIG. 8 illustrates an example of a log-in display screen.

In step SC700, the panel application 404 starts the processing. In step SC701, the panel application 404 performs control to display a log-in display screen (FIG. 8) on a display unit in the operation unit 308.

In step SC702, the panel application 404 performs user authentication using an IC card or the like. In the present exemplary embodiment, the user authentication is not an important process. Therefore, detailed description of a method for detecting an authentication card, a method for acquiring an identification ID of the IC card, and authentication processing performed by the authentication server are omitted.

Figure 9:
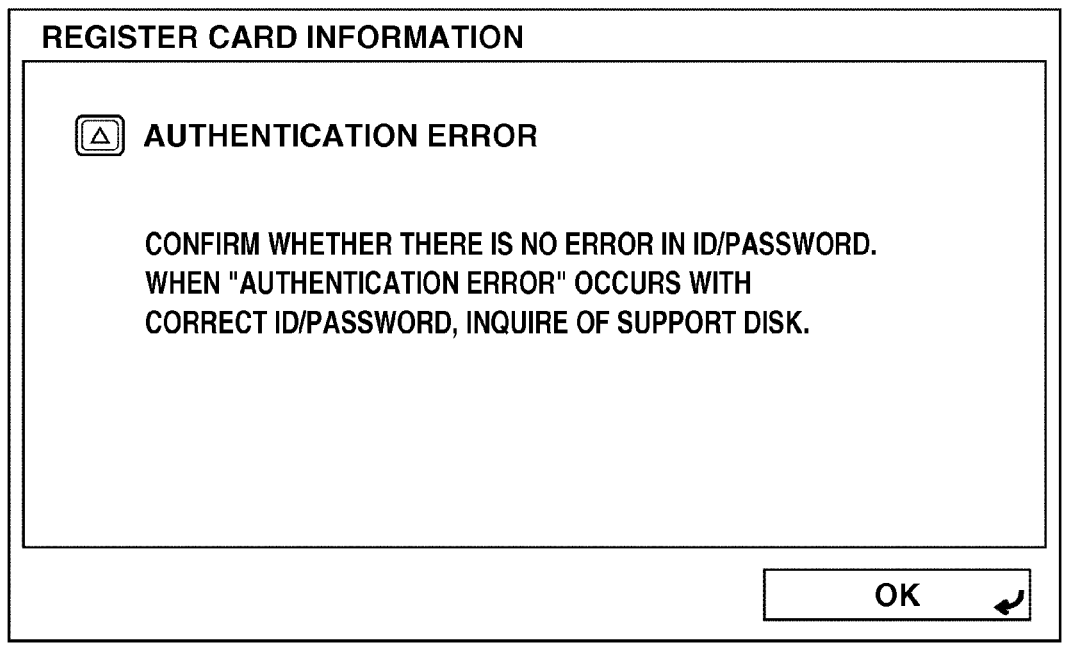
FIG. 9 illustrates an example of an error display screen.

In step SC703, the panel application 404 determines whether authentication has successfully been performed. If it is determined that the authentication has not successfully been performed (NO in step SC702), the processing proceeds to step SC704. In step SC704, the panel application 404 performs control to display an error display screen (FIG. 9) on the display unit in the operation unit 308. When the panel application 404 receives the press of the OK button on the error display screen, the processing returns to step SC701. In step SC701, the panel application 404 performs control to display the log-in display screen again. On the other hand, if it is determined that the authentication has successfully been performed (YES in step SC703), the processing proceeds to step SC705.

In step SC705, the panel application 404 acquires a name of a user who has successfully performed the authentication.

In step SC706, the panel application 404 acquires an IP address of the print server 101 corresponding to the user name. In the present exemplary embodiment, a method for resolving an address of the print server 101 for each user is not an important process. Therefore, the print server 101 used in each user is uniquely determined, and detailed description thereof is omitted. An implementing method includes a method for resolving an address by referring to the job management DB 403, in which a correspondence between user names and target print server addresses is registered, after user authentication.

An alternative implementing method may be to store a correspondence table between user names and target print server addresses in the HDD 304 in the image forming apparatus 102 and acquiring the address of the print server 101 used by the user from the correspondence table after user authentication.

In step SC707, the panel application 404 also sends a print job list request and a user name to the job management service 402.

In step SC708, the panel application 404 receives a print job list from the job management service 402. The print job list includes information such as a globally unique identifier (GUID), a job name, the number of copies, two-sided, a color mode, page aggregation, a date/time, and the number of pages. In the present exemplary embodiment, the print job list uses a data format that can be easily expanded, e.g., an XML format. Further, while items used for the print job list have been described above, the number of items may be increased or decreased, as needed.

In step SC709, the panel application 404 then performs control to display a print job list display screen (FIG. 10) on the display unit in the operation unit 308.

In step SC710, the panel application 404 ends the processing.

The print job list generation by the job management service 402 will be described below.

In step SB700, the job management service 402 starts the processing.

In step SB701, the job management service 402 receives the print job list request and the user name from the panel application 404.

In step SB702, the job management service 402 searches the job management DB 403 illustrated in FIG. 4 for records that match the user name obtained in step SB701.

In step SB703, the job management service 402 extracts one of the searched records.

In step SB704, the job management service 402 determines whether the record obtained as a search result can be extracted. If the record can be extracted (YES in step SB704), the processing proceeds to step SB705. In step SB705, the job management service 402 acquires a print job and meta data of the target record. If the record cannot be extracted (NO in step SB704), the processing proceeds to step SB706. In step SB706, the job management service 402 generates a print job list, and sends the generated print job list to the panel application 404.

In step SB707, the job management service 402 ends the job list generation processing.

Figure 11:
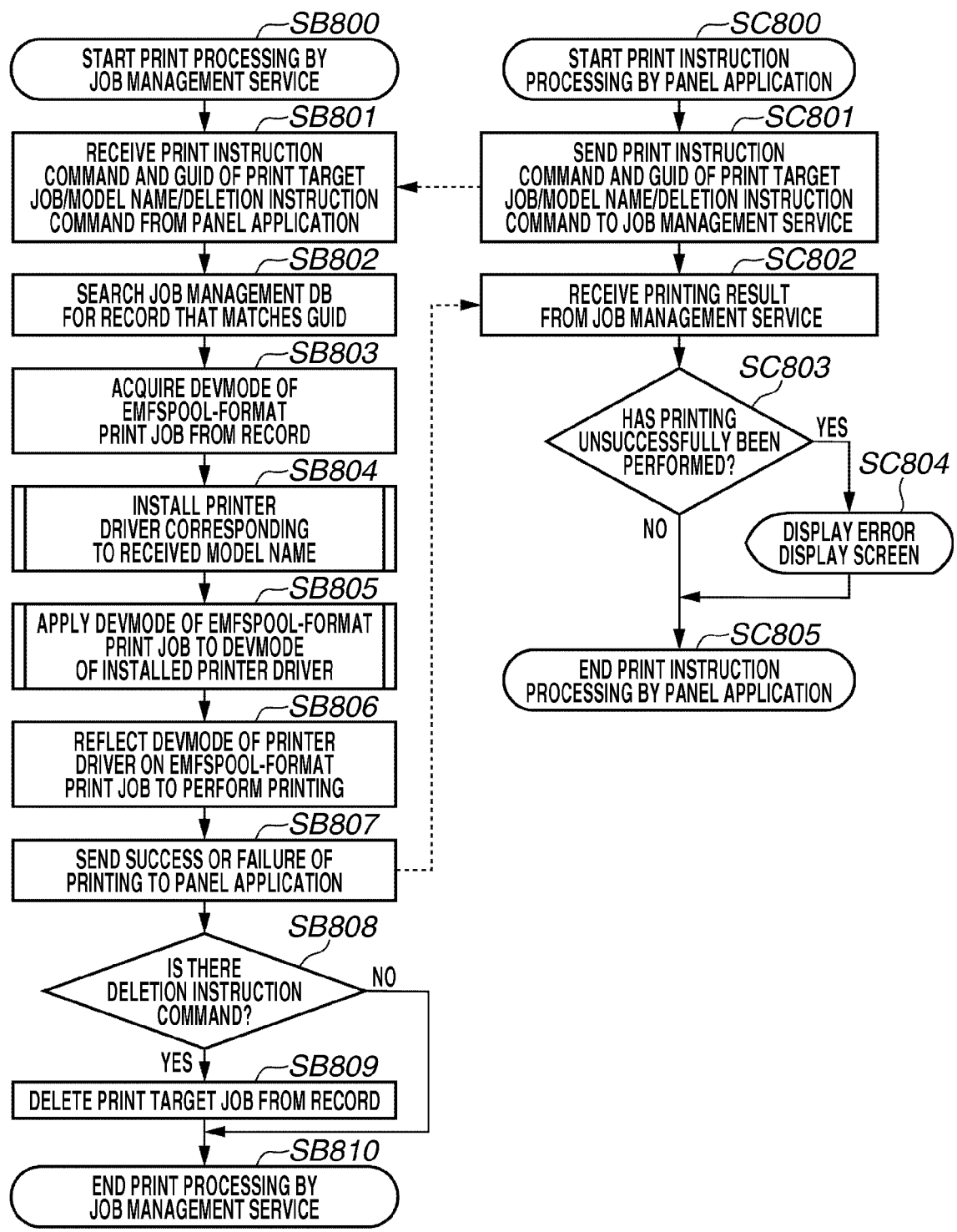
FIG. 11 is a flowchart illustrating an example of a third control procedure in the printing system.

FIG. 11 is a flowchart illustrating an example of a third control procedure in the printing system according to the present exemplary embodiment. The procedure illustrated in FIG. 11 corresponds to a procedure from the processing in (3-1) to the processing in (3-6) illustrated in FIG. 4. Steps SB800 to SB810 correspond to print processing performed by the job management service 402. The processing in the flowchart is implemented when the CPU 201 in the print server 101 illustrated in FIG. 1 loads a program stored in the external memory 211 onto the RAM 203 and executes the loaded program.

Steps SC800 to SC805 correspond to print instruction processing performed by the panel application 404 illustrated in FIG. 4. The processing in the flowchart is implemented when the CPU 301 in the image forming apparatus 102 illustrated in FIG. 1 loads a program stored in the external memory onto the RAM 302 and executes the loaded program.

The print instruction processing performed by the panel application 404 will be first described.

In step SC800, the panel application 404 starts the processing. If a user selects one print job in a print job list and presses a print button, the processing proceeds to step SC801. In step SC801, the panel application 404 sends a print instruction command to the job management service 402. The panel application 404 sends a GUID of the print job selected at this time, a model name of the image forming apparatus 102, and a deletion instruction command. The deletion instruction command is a command for determining whether the selected print job is deleted from the job management DB 403, and can be optionally sent by the user.

In step SC802, the panel application 404 receives a printing result (success or failure) from the job management service 402.

Figure 12:
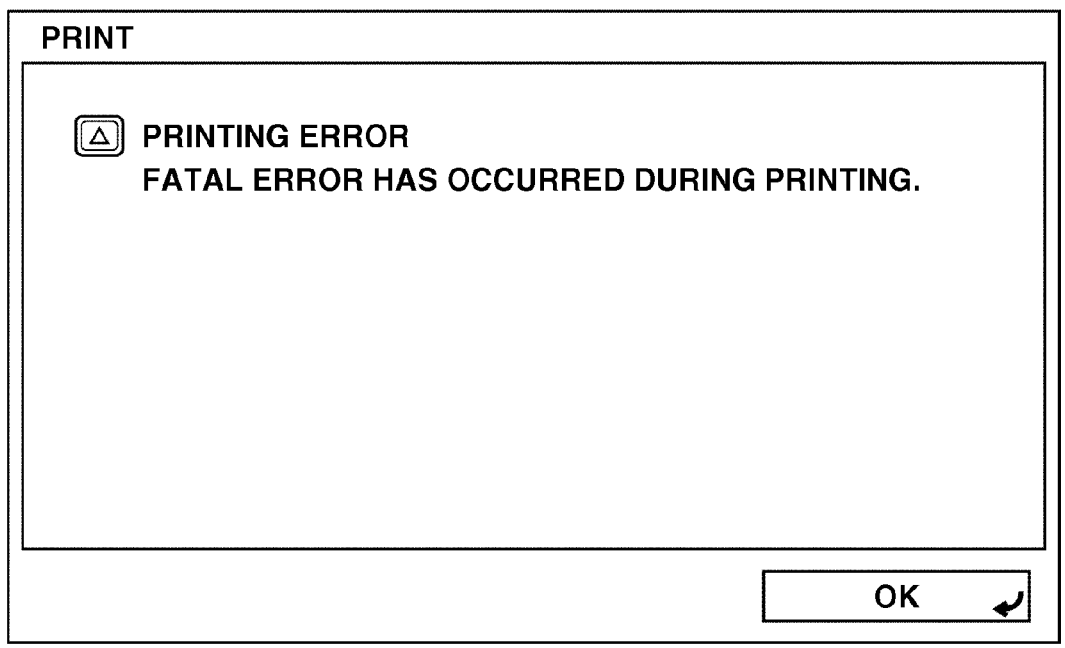
FIG. 12 illustrates an example of an error display screen.

In step SC803, the panel application 404 determines whether printing has unsuccessfully been performed. If it is determined that the printing has unsuccessfully been performed (YES in step SC803), the processing proceeds to step SC804. In step SC804, the panel application 404 performs control to display an error display screen (FIG. 12) on the display unit in the operation unit 308. Then, the processing proceeds to step SC805. On the other hand, if it is determined that the printing has successfully been performed (NO in step SC803), the processing proceeds to step SC805. In step SC805, the panel application 404 ends the processing.

The print processing performed by the job management service 402 will be described below.

In step SB800, the job management service 402 starts the processing.

In step SB801, the job management service 402 receives the print instruction command, and the GUID of the print job, the model name, and the deletion instruction command, which have been sent from the panel application 404 in step SC801.

In step SB802, the job management service 402 searches the job management DB 403 illustrated in FIG. 4 for a record that matches the GUID that has been obtained in step SB801.

In step SB803, the job management service 402 acquires a DEVMODE of an EMFSPOOL-format print job from the record obtained by the search.

In step SB804, the job management service 402 installs the printer driver 405 corresponding to the received model name (specified model name). This processing will be described in more detail with reference to FIG. 13, described below.

In step SB805, the job management service 402 applies the DEVMODE of the EMFSPOOL-format print job to a DEV- MODE of the installed printer driver 405. This processing will be described in more detail with reference to FIG. 14, described below.

In step SB806, the job management service 402 uses the DEVMODE, which has been obtained in step SB805, and the EMFSPOOL-format print job, and performs rendering with a graphic engine of the printer driver 405, to perform printing processing. The printer driver 405 constituting a logical printer generates a PDL, and sends a PDL job to the image forming apparatus 102.

In step SB807, the job management service 402 sends success or failure of printing in the printer driver 405 to the panel application 404.

In step SB808, the job management service 402 determines whether there is a deletion command in addition to the print command that has been received in step SB801. If it is determined that the deletion command exists (YES in step SB808), the processing proceeds to step SB809. In step SB809, the job management service 402 deletes the meta data and the EMFSPOOL-format print job of a target job from the record, and the processing proceeds to step SB810. If it is determined that the deletion command does not exist (NO in step SB808), the processing proceeds to step SB810. In step SB810, the job management service 402 ends the processing.

Figure 13:
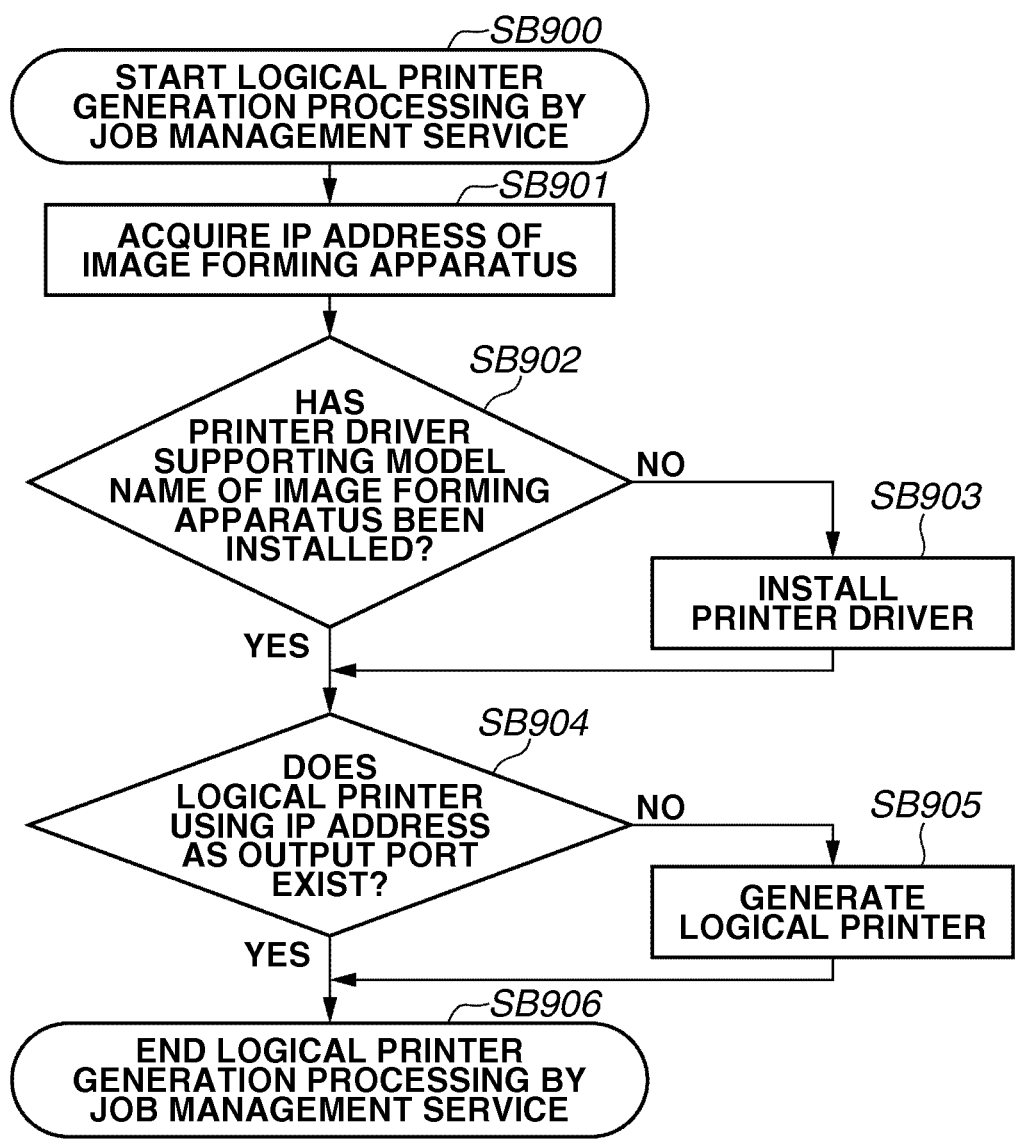
FIG. 13 is a flowchart of logical printer generation processing that is called up in step SB804 illustrated in FIG. 11.

FIG. 13 is a flowchart of logical printer generation processing that is called up in step SB804 illustrated in FIG. 11.

In step SB900, the job management service 402 starts the processing.

In step SB901, the job management service 402 acquires an IP address of the image forming apparatus 102 illustrated in FIG. 1. The job management service 402 obtains the IP address of the image forming apparatus 102 when connection for data sending/receiving with the panel application 404 is established.

In step SB902, the job management service 402 determines whether a printer driver, which supports a model name of the image forming apparatus 102 illustrated in FIG. 1, is installed on the print server 101. If the printer driver has not been installed (NO in step SB902), the processing proceeds to step SB903. In step SB903, the job management service 402 installs the printer driver, which supports the model name of the image forming apparatus 102 illustrated in FIG. 1, on the print server 101. Then, the processing proceeds to step SB904. On the other hand, if it is determined that the printer driver is installed (YES in step SB902), the processing proceeds to step SB904. The printer driver, which has already been installed in this stage, corresponds to the printer driver 405 illustrated in FIG. 4.

In step SB904, the job management service 402 determines whether a logical printer constituted by the installed printer driver and using the IP address, which has been obtained in step SB901, as an output port exists on the print server 101. If it is determined that the logical printer does not exist (NO in step SB904), the processing proceeds to step SB905. In step SB905, the job management service 402 generates a logical printer using the IP address, which has been obtained in step SB901, as an output port using the installed printer driver. Then, the processing proceeds to step SB906. On the other hand, if it is determined that the logical printer exists (YES in step SB904), the processing proceeds to step SB906. In step SB906, the job management service ends the processing.

Figure 14:
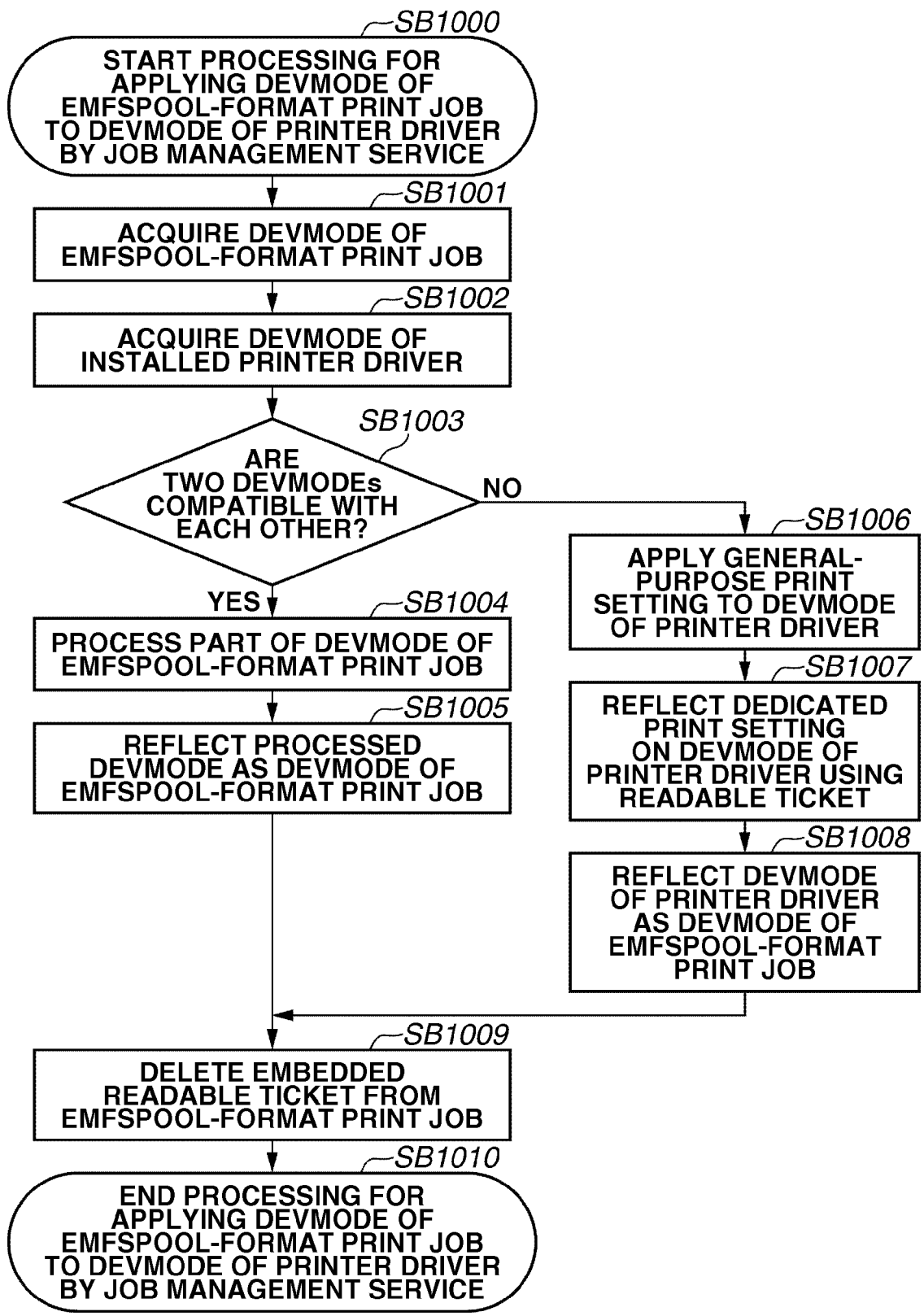
FIG. 14 is a flowchart of processing for applying a DEVMODE of an EMFSPOOL-format print job, which is called up in step SB805 illustrated in FIG. 11, to a DEVMODE of a printer driver.

FIG. 14 is a flowchart illustrating processing for applying a DEVMODE of the EMFSPOOL-format print job, which is called up in step SB805 illustrated in FIG. 11, to a DEVMODE of the printer driver 405.

In step SB1000, the job management service 402 starts the processing.

In step SB1001, the job management service 402 acquires the DEVMODE of the EMFSPOOL-format print job.

In step SB1002, the job management service 402 acquires the DEVMODE of the installed printer driver 405.

In step SB1003, the job management service 402 determines whether the two acquired DEVMODEs are compatible with each other. In the present exemplary embodiment, the job management service 402 compares information about model names and version information between the DEVMODE of the printer driver 405 and the DEVMODE of the EMFSPOOL-format print job, to determine whether the DEVMODEs are compatible with each other. More specifically, the job management service 402 determines that the DEVMODEs are compatible with each other when the version information and the model names are the same. While the compatibility has been determined using the version information and the model names of the DEVMODEs in the above-mentioned example, the compatibility may also be determined using the sizes and keywords of the DEVMODEs. If it is determined that the DEVMODEs are compatible with each other (YES in step SB1003), the processing proceeds to step SB1004.

In step SB1004, the job management service 402 processes a part of the DEVMODE of the EMFSPOOL-format print job. In the printer driver 405, the setting may be changed to a default depending on a structure of a DEVMODE used during printing. Therefore, in this processing, in order not to change the setting to a default, description of the DEVMODE is required to be changed. For example, the job management service 402 describes the version information and the model name, which have been acquired from the DEVMODE of the installed printer driver 405, for the version information and the model name of the DEVMODE of the EMFSPOOL-format print job.

In step SB1005, the job management service 402 reflects the processed DEVMODE as the DEVMODE of the EMFSPOOL-format print job, and the processing proceeds to step SB1009.

If it is determined that the DEVMODEs are incompatible with each other (NO in step SB1003), the processing proceeds to step SB1006. In step SB1006, the job management service 402 applies general-purpose setting of the DEVMODE of the EMFSPOOL-format print job to the DEVMODE of the printer driver 405.

In step SB1007, the job management service 402 reflects dedicated print setting on the DEVMODE of the printer driver 405 using a readable ticket.

In step SB1008, the job management service 402 reflects the DEVMODE of the printer driver 405 as the DEVMODE of the EMFSPOOL-format print job, and the processing proceeds to step SB1009. As a result, print setting information is reflected in all items if the DEVMODEs are compatible with each other, and dedicated print setting described in the readable ticket are reflected on the DEVMODE of the printer driver 405 if the DEVMODEs are incompatible with each other.

If it is determined that the DEVMODE of the EMFSPOOL-format print job and the installed printer driver 405 are compatible with each other by the above-mentioned processing, "anywhere printing" 501, on which all print setting information have been reflected, can be implemented. If it is determined that the DEVMODEs are incompatible with each other, "anywhere printing" 501, on which general-purpose print setting and dedicated print setting described in the readable ticket have been reflected, can be implemented.

Figure 15:
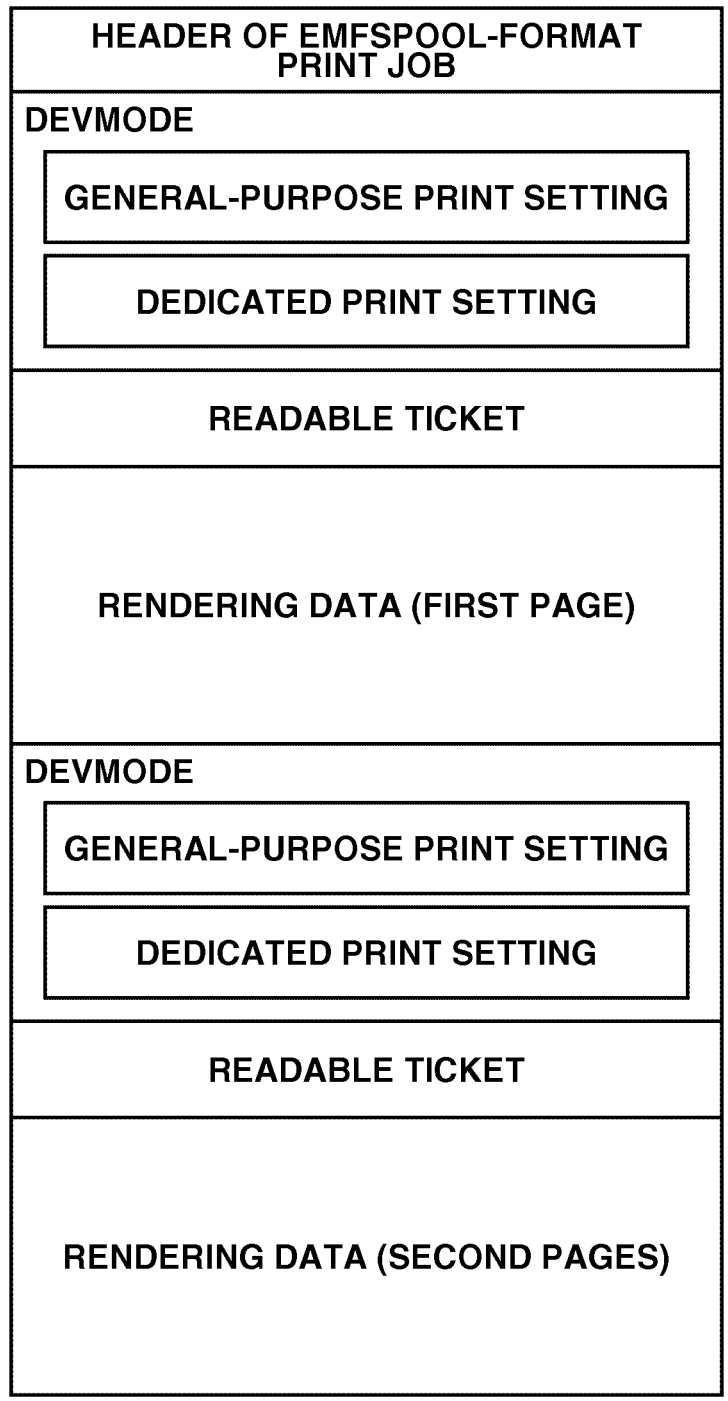
FIG. 15 illustrates processing performed when a plurality of DEVMODEs exists within an EMFSPOOL-format print job.

Further, processing performed when a plurality of DEVMODEs exists within the EMFSPOOL-format print job will be described below. Basically, the DEVMODE can be set for each page (FIG. 15). FIG. 15 illustrates processing performed when a plurality of DEVMODEs exists within the EMF-SPOOL-format print job.

If data of sheet sizes, which differ in a print job, for example, "A4" on the first page and "B5" on the second page, is printed, for example, a plurality of DEVMODEs exists in the print job. Therefore, DEVMODE replacement processing in the present exemplary embodiment is equally performed for all the DEVMODEs in the print job.

In step SB1009, the job management service 402 deletes the embedded readable ticket from the EMFSPOOL-format print job, to end the processing for applying the DEVMODEs and the processing for processing the EMFSPOOL-format print job.

According to each of the above-mentioned exemplary embodiments, in the pull-print printing system, one driver is installed on the client PC. Even when detailed print setting information is set, if printing is performed for compatible models of the image forming apparatuses 102, all print setting information can be taken over and output. Main print setting information can be reflected on the other image forming apparatuses 102. "Anywhere printing" 501, on which the print setting information intended by the user is more reflected, can be implemented.

More specifically, in the pull-print printing system, the printing, on which print setting information set in the client PC 100 is reflected, can be performed.

According to the present invention, in the pull-print printing system, the printing, on which print setting performed in the client PC 100 is reflected, can be performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-172180 filed Aug. 5, 2011, which is hereby incorporated by reference herein in its entirety.

What is claimed is:

1. A printing system comprising:
a client apparatus;
a server apparatus; and
an image forming apparatus,
wherein the client apparatus includes
a ticket generation unit configured to generate a ticket from print setting information set by a first printer driver installed in the client apparatus,
a print job generation unit configured to generate a first print job including the print setting information, the ticket generated by the ticket generation unit, and rendering data,
a sending unit configured to send the first print job generated by the print job generation unit to the server apparatus, and
wherein the server apparatus includes
a receiving unit configured to receive the first print job sent by the sending unit,
a reflection unit configured to reflect the print setting information obtained from the ticket on a second printer driver, which is installed in the server apparatus, for the image forming apparatus if a print request is received from the image forming apparatus and the print setting information included in the first print job specified in the print request cannot be applied to the image forming apparatus, and
an output unit configured to generate a second print job based on the print setting information reflected by the reflection unit and the rendering data included in the first print job, and output the generated second print job to the image forming apparatus.

2. The printing system according to claim 1, further comprising
a storage unit configured to store the first print job received by the receiving unit in a storage device,
wherein the reflection unit applies general-purpose print setting to the print setting information of the second printer driver when the print setting information of the second printer driver and the print setting information in the first print job stored in the storage device are incompatible with each other, and applies dedicated print setting to the print setting information to which the general-purpose print setting has been applied using the ticket in the first print job stored in the storage device.

3. The printing system according to claim 2, wherein the reflection unit processes the print setting information in the first print job stored in the storage device when the print setting information of the second printer driver and the print setting information in the first print job stored in the storage device are compatible with each other, and reflects the processed print setting information on the print setting information in the first print job stored in the storage device.

4. A server apparatus comprising:
a receiving unit configured to receive a first print job including print setting information, a ticket generated from the print setting information, and rendering data;
a reflection unit configured to reflect the print setting information obtained from the ticket on a printer driver, which is installed in the server apparatus, for an image forming apparatus if a print request is received from the image forming apparatus and the print setting information included in the first print job specified in the print request cannot be applied to the image forming apparatus; and
an output unit configured to generate a second print job based on the print setting information reflected by the reflection unit and the rendering data included in the first print job, and output the generated second print job to the image forming apparatus.

5. The server apparatus according to claim 4, further comprising
a storage unit configured to store the first print job received by the receiving unit in a storage device, wherein the reflection unit applies general-purpose print setting to the print setting information of the printer driver when the print setting information of the printer driver and the print setting information in the first print job stored in the storage device are incompatible with each other, and applies dedicated print setting to the print setting information to which the general-purpose print setting has been applied using the ticket in the first print job stored in the storage device.

6. The server apparatus according to claim 5, wherein the reflection unit processes the print setting information in the first print job stored in the storage device when the print setting information of the printer driver and the print setting information in the first print job stored in the storage device are compatible with each other, and reflect the processed print setting information on the print setting information in the first print job stored in the storage device.

7. An information processing method in a printing system comprising a client apparatus, a server apparatus, and an image forming apparatus, the method comprising:
generating a ticket from print setting information set by a first printer driver,
generating a first print job including the print setting information, the generated ticket, and rendering data;
sending the generated first print job to the server apparatus;
receiving the sent first print job in the server apparatus,
reflecting the print setting information obtained from the ticket on a second printer driver, which is installed in the server apparatus, for the image forming apparatus if a print request is received from the image forming apparatus and the print setting information included in the first print job specified in the print request cannot be applied to the image forming apparatus; and
generating a second print job based on the reflected print setting information and the rendering data included in the first print job, and outputting the generated second print job to the image forming apparatus.

8. The information processing method according to claim 7, further comprising
storing the received first print job in a storage device,
wherein in the reflecting, general-purpose print setting is applied to the print setting information of the second printer driver when the print setting information of the second printer driver and the print setting information in the first print job stored in the storage device are incompatible with each other, and dedicated print setting is applied to the print setting information to which the general-purpose print setting has been applied using the ticket in the first print job stored in the storage device.

9. The information processing method according to claim 8, wherein
in the reflecting, the print setting information in the first print job stored in the storage device is processed when the print setting information of the second printer driver and the print setting information in the first print job stored in the storage device are compatible with each other, and the processed print setting information is reflected on the print setting information in the first print job stored in the storage device.

10. An information processing method performed by a server apparatus, comprising:
receiving a first print job including print setting information, a ticket generated from the print setting information, and rendering data,
reflecting the print setting information obtained from the ticket on a printer driver, which is installed in the server apparatus, for an image forming apparatus if a print request is received from the image forming apparatus and the print setting information included in the first print job specified in the print request cannot be applied to the image forming apparatus; and
generating a second print job based on the reflected print setting information and the rendering data included in the first print job, and outputting the generated second print job to the image forming apparatus.

11. The information processing method according to claim 10, further comprising
storing the received first print job in a storage device,
wherein in the reflecting, general-purpose print setting is applied to the print setting information of the printer driver when the print setting information of the printer driver and the print setting information in the first print job stored in the storage device are incompatible with each other, and dedicated print setting is applied to the print setting information to which the general-purpose print setting has been applied using the ticket in the first print job stored in the storage device.

12. The information processing method according to claim 11, wherein
in the reflecting, the print setting information in the first print job stored in the storage device is processed when the print setting information of the printer driver and the print setting information in the first print job stored in the storage device are compatible with each other, and the processed print setting information is reflected on the print setting information in the first print job stored in the storage device.

13. A non-transitory computer-readable storage medium storing a program for causing a computer to:
receive a first print job including print setting information, a ticket generated from the print setting information, and rendering data;
reflect the print setting information obtained from the ticket on a printer driver, installed in the computer, for an image forming apparatus if a print request is received from the image forming apparatus and the print setting information included in the first print job specified in the print request cannot be applied to the image forming apparatus; and
generate a second print job based on the reflected print setting information and the rendering data included in the first print job, and output the generated second print job to the image forming apparatus.

14. The non-transitory computer-readable storage medium according to claim 13, further comprising
storing the received first print job in a storage device,
wherein in the reflect, general-purpose print setting is applied to the print setting information of the printer driver when the print setting information of the printer driver and the print setting information in the first print job stored in the storage device are incompatible with each other, and dedicated print setting is applied to the print setting information to which the general-purpose print setting has been applied using the ticket in the first print job stored in the storage device.

15. The non-transitory computer-readable storage medium according to claim 14, wherein
in the reflect, the print setting information in the first print job stored in the storage device is processed when the print setting information of the printer driver and the print setting information in the first print job stored in the storage device are compatible with each other, and the processed print setting information is reflected on the print setting information in the first print job stored in the storage device.

\* \* \* \* \*